(12) United States Patent
Williams et al.

(10) Patent No.: US 9,038,896 B2
(45) Date of Patent: May 26, 2015

(54) TICKET VALIDATION SYSTEM

(71) Applicant: VenueNext, Inc., Palo Alto, CA (US)

(72) Inventors: Dan Williams, San Carlos, CA (US);
Brandon Stout, Campbell, CA (US);
Renaud Casanova, Danville, CA (US)

(73) Assignee: VENUENEXT, INC., Palo Alto, CA (US)

( * ) Notice: Subject to any disclaimer, the term of this patent is extended or adjusted under 35 U.S.C. 154(b) by 0 days.

(21) Appl. No.: 14/465,380

(22) Filed: Aug. 21, 2014

(65) Prior Publication Data

US 2015/0053757 A1 Feb. 26, 2015

Related U.S. Application Data

(60) Provisional application No. 61/870,168, filed on Aug. 26, 2013.

(51) Int. Cl.
*G06F 7/08* (2006.01)
*G07B 15/02* (2011.01)
*G06K 7/10* (2006.01)
*G06K 7/14* (2006.01)
*G07B 11/00* (2006.01)

(52) U.S. Cl.
CPC ............. *G06K 7/10009* (2013.01); *G06K 7/14* (2013.01); *G07B 11/00* (2013.01); *G06K 7/10099* (2013.01)

(58) Field of Classification Search
USPC .................................. 235/375, 383, 451, 492
See application file for complete search history.

(56) References Cited

U.S. PATENT DOCUMENTS

| | | | |
|---|---|---|---|
| 2003/0004792 A1* | 1/2003 | Townzen et al. ................. | 705/13 |
| 2004/0204215 A1* | 10/2004 | Meehan et al. ................... | 463/16 |
| 2005/0128304 A1* | 6/2005 | Manasseh et al. ........ | 348/207.99 |
| 2005/0251458 A1* | 11/2005 | Perkowski ....................... | 705/26 |
| 2007/0135205 A1* | 6/2007 | Houle et al. ...................... | 463/19 |
| 2008/0318671 A1* | 12/2008 | Rowe et al. ..................... | 463/26 |
| 2011/0233274 A1* | 9/2011 | Flanagan et al. .............. | 235/377 |
| 2013/0332509 A1* | 12/2013 | Schwartz et al. ............. | 709/203 |

\* cited by examiner

*Primary Examiner* — Tuyen K Vo
(74) *Attorney, Agent, or Firm* — Hickman Palermo Becker Bingham LLP

(57) ABSTRACT

A ticket reading system comprising a portable head section with an aperture and means for removably affixing the head section to a stationary fixture; in the head section, a camera with a field of view over the aperture to read visible code elements of a ticket; an RFID antenna and module adjacent to the aperture to read RFID/NFC code elements from a device or tag; a wireless network communication module to communicate data packets among a processor and a wireless network access point; means for ticket validation feedback; instructions which cause: receiving a ticket identifier value from the camera or RFID module; sending a request via the wireless network for a server computer to validate the ticket identifier value; receiving a ticket validation response from the server computer; based upon the response, driving the means for providing ticket validation feedback to generate either valid response feedback or invalid response feedback.

16 Claims, 9 Drawing Sheets

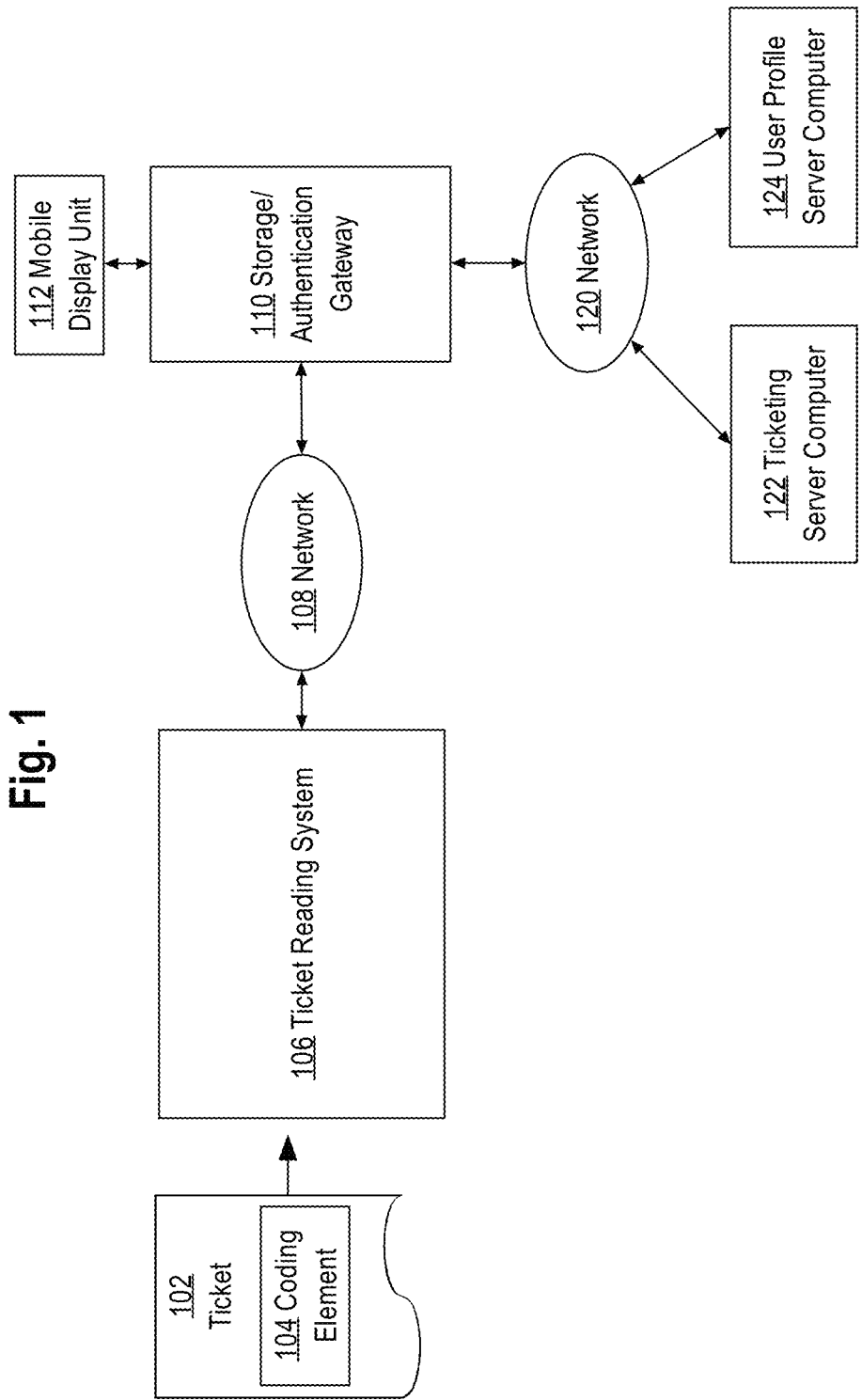

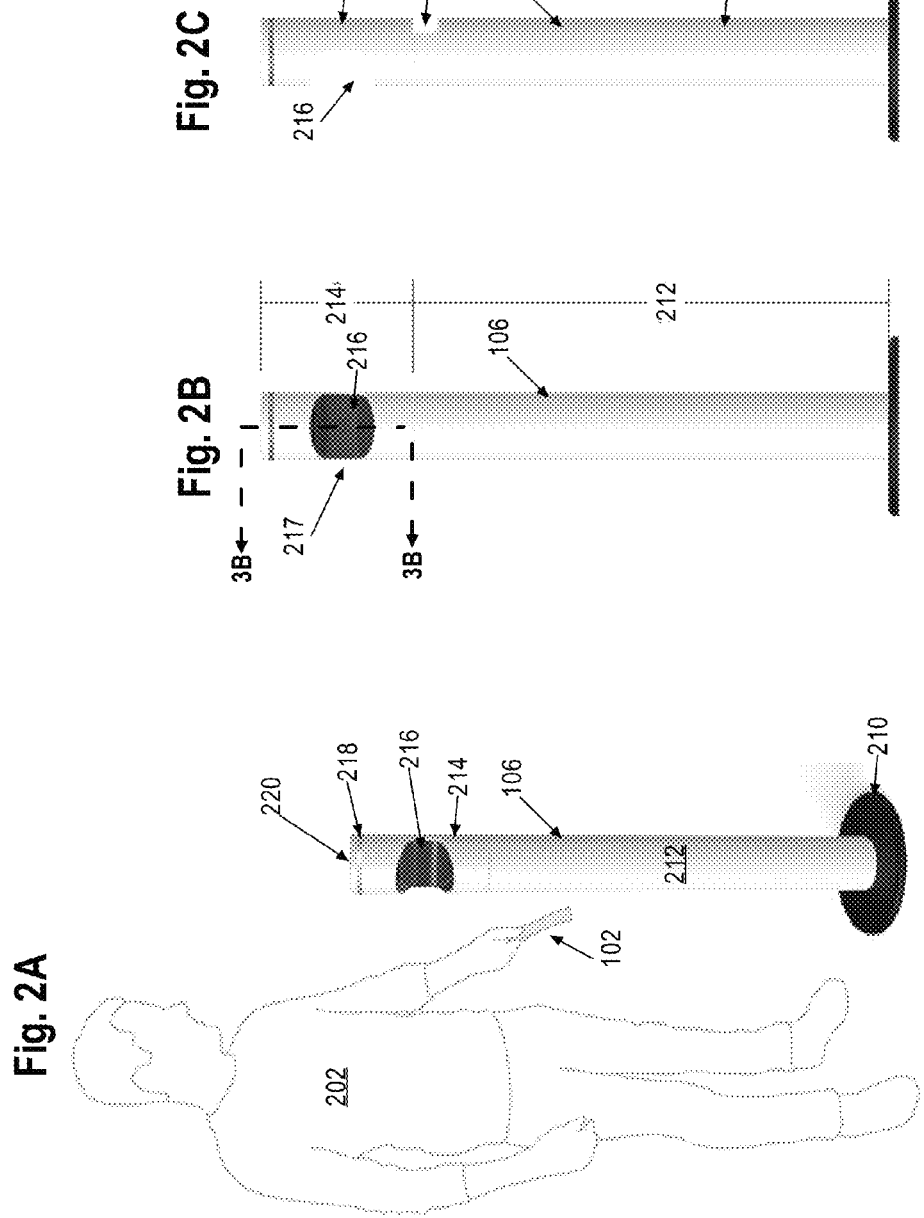

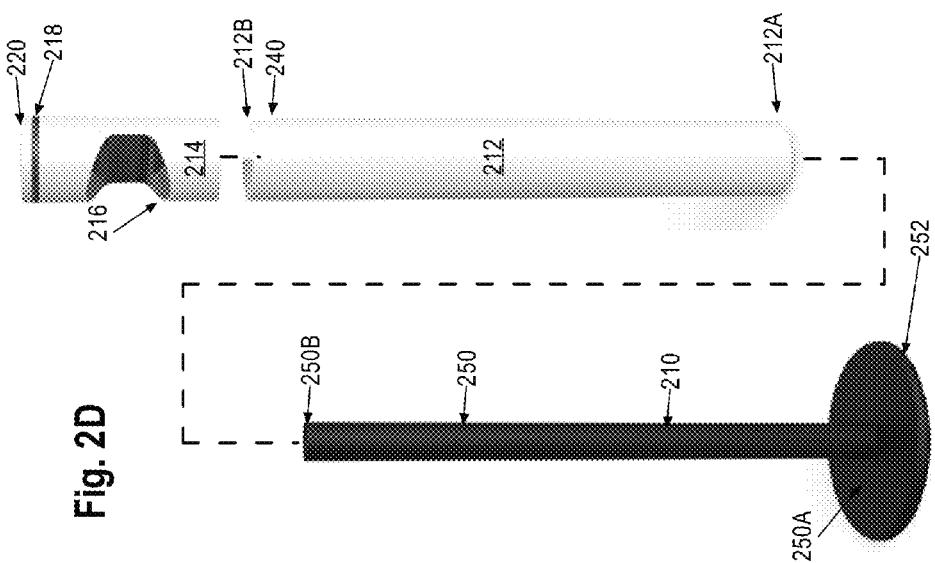

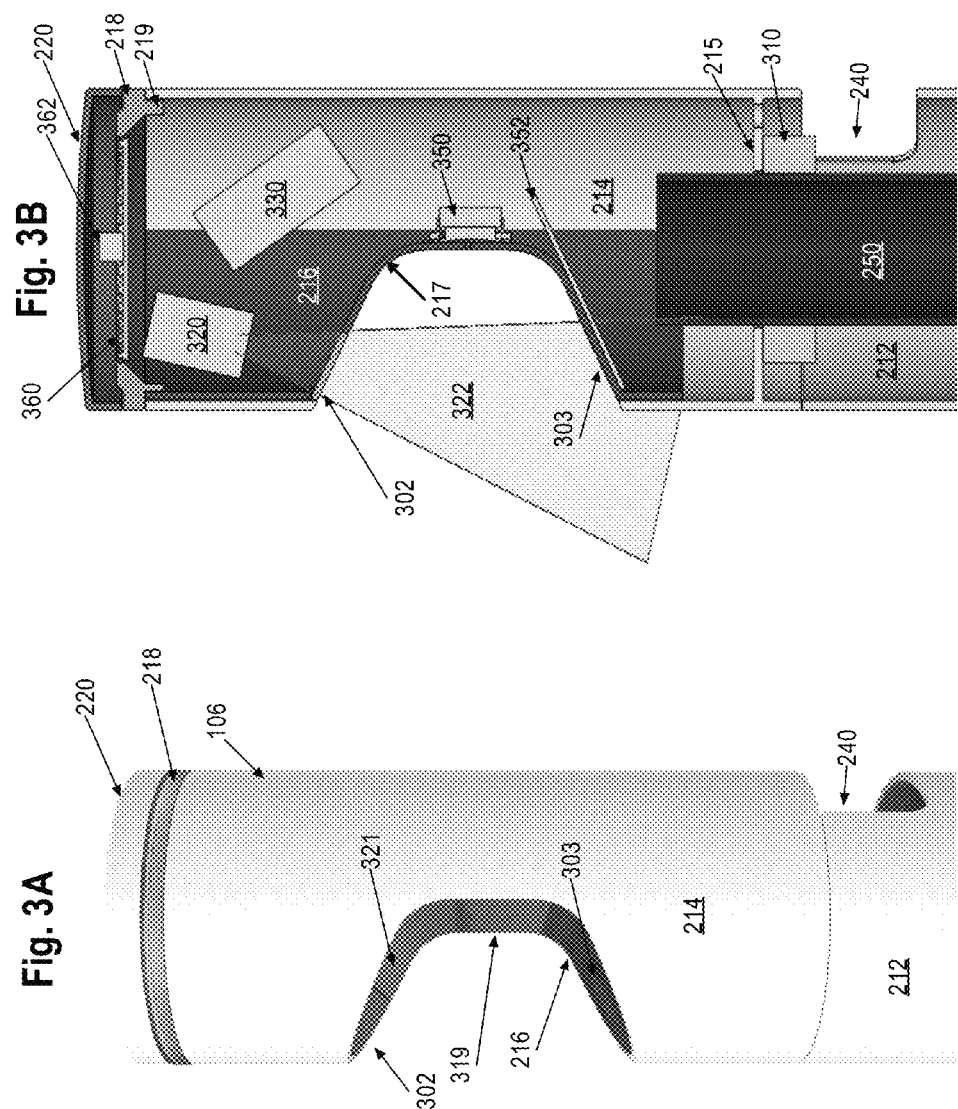

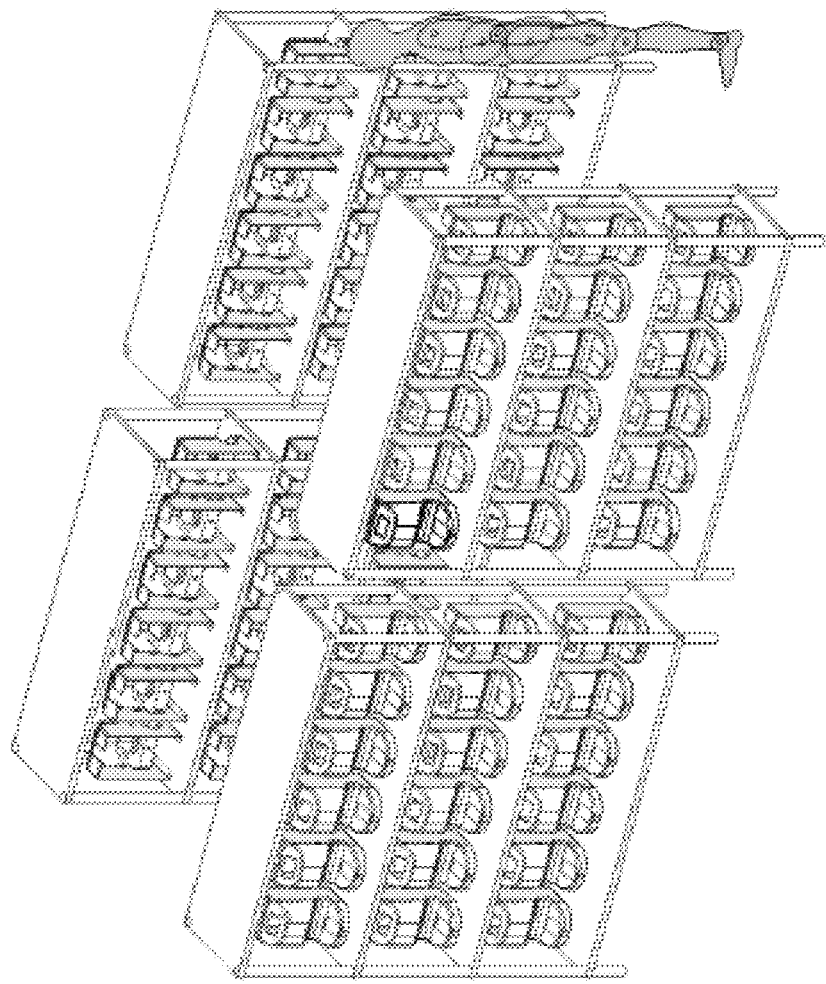

TICKET VALIDATION SYSTEM

BENEFIT CLAIM

This application claims the benefit under 35 U.S.C. 119(e) of provisional application 61/870,168, filed Aug. 26, 2013, the entire contents of which are hereby incorporated by reference for all purposes as if fully set forth herein.

FIELD OF THE DISCLOSURE

The present disclosure relates to digital electronic apparatus for scanning and validating tickets at venues such as stadiums.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large-capacity event facilities such as stadiums and arenas normally control entry to an event using pre-purchased tickets. Each fan, patron or customer ("user") who wishes to attend an event must purchase or obtain a ticket in advance, and the ticket is valid only for a particular event, represented by a particular day, time, and venue or location. To prevent unauthorized duplication of tickets, encoding mechanisms are used on the tickets. Some encoding mechanisms, such as printed barcodes, are capable of forgery, and therefore the security of the venue and enforcement of valid ticketing requires the venue to be able to scan or read and validate a large number of tickets in a short period of time. For example, a venue might need to read and validate 10,000 tickets in a 30-minute time period to accommodate the sudden arrival of a large crowd at a particular event.

Multiple different encoding mechanisms have been developed including printed barcodes and printed QR codes, as well as codes that are digitally displayed on the display screen of a mobile computing device such as a smartphone held by the user. Radio-frequency identification (RFID) tags also offer potential use in ticketing, and some smartphones equipped with near-field communication (NFC) transmitters are capable of operating in an RFID emulation mode in which the smartphone appears to generate a signal coming from an RFID tag.

The emergence of these technologies presents large-capacity venues with new challenges. For example, fans attending a sports event may present any one of the foregoing ticketing mechanisms as their valid ticket, and the venue cannot predict in advance the number or order in which these mechanisms will be used. Whether a fan provides a printed ticket with a barcode, a QR code displayed on a smartphone screen, or a smartphone that is generating a ticket code via NFC is unpredictable at the time of an event. Therefore, venues have a need to scan, read and validate any of the foregoing kinds of identifiers on a high-speed basis, with minimum involvement of staff and with the smallest, most efficient equipment.

SUMMARY

The appended claims may serve as a summary of the invention.

BRIEF DESCRIPTION OF THE DRAWINGS

In the drawings:

FIG. 1 illustrates a networked computer system that may be configured for reading tickets.

FIG. 2A is a perspective view of a ticket reader in relation to a human figure.

FIG. 2B is a front elevation view of the ticket reader of FIG. 2A.

FIG. 2C is a side elevation view of the ticket reader of FIG. 2A.

FIG. 2D is an exploded perspective view of the ticket reader of FIG. 2A.

FIG. 3A is an enlarged view of a reader head section of the ticket reader of FIG. 2A.

FIG. 3B is a section view of the reader head section of FIG. 3A illustrating certain internal elements.

FIG. 6B illustrates an example charging rack configuration comprising four (4) charging racks each configured to accept eighteen (18) units of the head section for concurrent charging.

DETAILED DESCRIPTION

Figure 4:
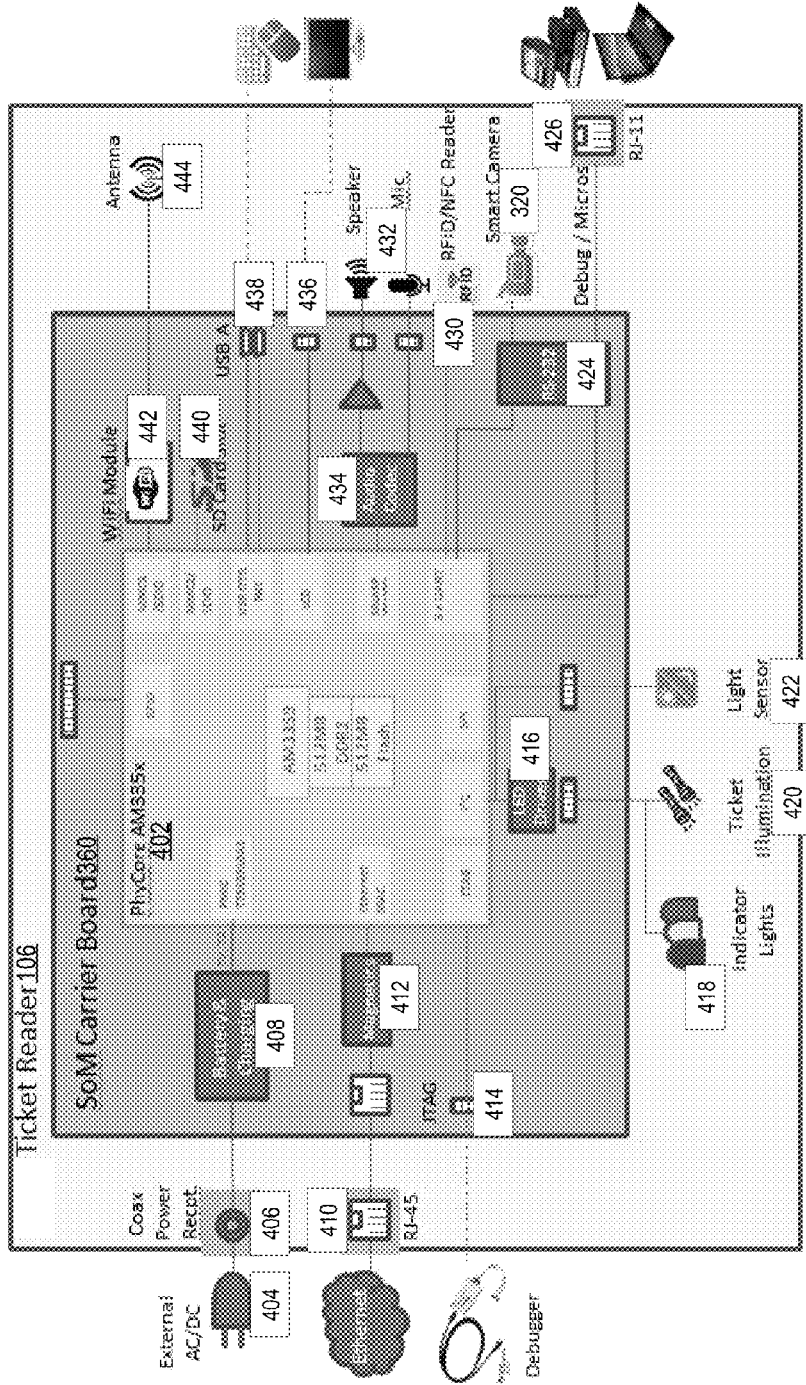
FIG. 4 is a block diagram of digital electronic elements of the ticket reader of FIG. 2A.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Overview

In an embodiment, a ticket reading system comprises a portable head section comprising an aperture and means for removably affixing the head section to a stationary fixture; in the portable head section, a camera mounted with a field of view over the aperture and configured to read visible code elements of a ticket; a radio-frequency identification (RFID) antenna and RFID module adjacent to the aperture and configured to read RFID or NFC code elements from a mobile computing device or RFID tag; a computer comprising at least a processor coupled to a non-transitory computer-readable storage device; a wireless network communication module configured to communicate data packets among the processor and a wireless network access point; means for providing ticket validation feedback; wherein the storage device comprises one or more sequences of instructions which, when executed by the processor, cause the processor to perform: receiving a ticket identifier value from one of the camera or the RFID module; forming and sending a request via the wireless network communication module for a server computer to validate the ticket identifier value; receiving a ticket validation response from the server computer via the wireless network communication module; based upon the ticket validation response, driving the means for providing ticket validation feedback to generate either valid response feedback or invalid response feedback.

Other embodiments, variations and alternatives are described in the following sections. Embodiments provide a mobile and wireless ticket reading apparatus that can read tickets encoded with barcodes, QR codes, and other kinds of codes, and read tickets that contain radio-frequency identification (RFID) tags. In an embodiment, a ticket reading apparatus provides real-time ticket validation using a wireless data communication link to server computers. Feedback in audible and visual form is provided to users and to staff member of a venue at which the ticket reading apparatus is used. While the apparatus is mobile and portable, it is also configured for affixing to a stationary mounting apparatus such as a post and housing. Thus, the apparatus does not require handheld use by staff but can be located in a fixed position for self-service use by end users, such as fans, patrons, or other customers of a large-capacity venue such as a stadium or arena, yet the apparatus also is capable of rapid movement to a tabletop location or other non-fixed position.

FIG. 1 illustrates a networked computer system that may be configured for reading tickets. As an overview, in one embodiment, a ticket 102 having a coding element 104 is used in proximity to a ticket reading system 106. In various embodiments, ticket 102 may be a tangible ticket that is printed, or may be represented in a graphical user interface on a display unit of a mobile computing device such as a smartphone, tablet computer, or other movable computer. In various embodiments, coding element 104 comprises a code, device, or other element that is capable of showing, displaying or transmitting a unique identifier for the ticket. Examples of coding element 104 include: a barcode, either printed or displayed on the display unit of a mobile computing device; a QR code, either printed or displayed on the display unit of a mobile computing device; an RFID tag.

In one embodiment, a number of ticket reading systems 106 are used as elements of access control for a venue such as a stadium, arena, hall, or other facility. For example, a set of ticket reading systems 106 may be arranged at an ingress point to a stadium and configured in association with paths, walls, turnstiles or other physical elements that guide patrons or serve as barriers to entry into the venue. In an embodiment, the ticket reading system 106 is configured for use as a ticket reader and validator, but is not required to be integrated into a physical barrier such as a gate or turnstile.

In an embodiment, ticket reading system 106 is coupled to network 108, which broadly represents any combination of one or more wireless or wired local area networks, wide area networks, or internetworks. For example, ticket reading system 106 may comprise a wireless network interface that becomes associated wirelessly to a wireless access point that serves as an ingress to and egress from the network 108.

In an embodiment, network 108 is coupled to a storage/authentication gateway 110, which may communicate with a mobile display unit 112 and a second network 120. For example, in one embodiment the gateway 110 implements a local cache for ticket data, and serves as a transfer point for relaying requests to authenticate ticket 102 to one or more of a ticketing server computer 122 and a user profile server computer 124. The local cache may comprise a local database that is accessible from the ticket reading system 106 via function calls.

In an embodiment, the ticketing server computer 122 is owned by, operated by, or associated with a ticket issuing entity such as a team, venue, ticket agent, ticket broker, or other ticket provider; the specific nature of the entity is not critical, but normally the ticketing server computer is configured to validate the ticket 102 based upon the coding element 104.

In an embodiment, the user profile server computer 124 is owned by, operated by, or associated with an entity that has an interest in managing multiple ticket purchases by the same individual or entity, or an interest in managing multiple entrances by the same ticket holder or entity to the venue. For example, user profile server computer 124 may be owned, operated or managed by the venue, or a team that is a principal tenant of the venue, or a similar party. In an embodiment, user profile server computer 124 is configured to store profiles of ticket purchasers for the purpose of improving the accuracy of validations of the ticket 102 or for the purpose of determining a preferred method of validating the ticket for a particular ticket holder or user.

Mobile display unit 112 may comprise a mobile computing device such as a smartphone, tablet computer, laptop computer, or other device that can be coupled to the gateway 110 wirelessly or by wired means to obtain data from the gateway. For example, the mobile display unit 112 may be used by administrative staff at the venue to monitor performance of the ticket reading systems 106 and/or the gateway 110.

2. Example Mechanical Structure

FIG. 2A is a perspective view of a ticket reader in relation to a human figure. In an embodiment, a ticket 102 held by a user 202 may be validated by bringing the ticket into proximity of the ticket reading system 106 using the means and processes that are further described herein. In an embodiment, ticket reading system 106 generally comprises a stationary fixture such as the combination of a base post 210 and an elongated skirt 212 affixed on the base post, and a portable, removable head section 214. In an embodiment, skirt 212 and the head section 214 may be cylindrical in cross-section and formed using pipe, tubing or similar materials; for example, aluminum may be used.

As an example, in one embodiment the head section is approximately 11.9 inches in height and the skirt 212 is approximately 36.9 inches in height, an overall height of the ticket reader system 106 from base to cap is about 49.6 inches, and the outside diameter of the housing and head section are approximately 5.5"; however, these dimensions are not critical and may be varied in other embodiments. Other embodiments may use other cross-sectional geometry and the specific geometry shown in FIG. 2A, FIG. 2B, FIG. 2C is not required.

In an embodiment, head section 214 comprises a mounting table 216, a lens 218 and a cap 220. In an embodiment, mounting table 216 may be formed of cast urethane or injection-molded plastic that is snugly affixed to inside surfaces of the head section 214 so that exterior surfaces of the mounting table are flush to cut edges of the head section, thereby providing a fluid appearance and promoting cleaning. Adhesive sealants may be used for fixing mounting table 216 to head section 214 to discourage water penetration, and other appropriate environmental sealing may be used for cap 220 and lens 218. The mounting table 216 may comprise a transparent or translucent illumination surface 217 through which a plurality of sensors, readers or cameras may detect the coding element 104 of ticket 102, as further described. As best seen in FIG. 3A, mounting table 216 may comprise a continuous molding featuring an upper wall 321, side wall 319, and lower wall 303 joined at obtuse angles and forming an aperture.

The lens 218 may comprise a generally annular light ring of transparent or translucent material, such as clear urethane or plastics, attached to mounting table 216 through which light from an illumination element, such as one or more light-emitting diodes or lamps, may be emitted. Use of a generally annular ring permits users to see light emitted through the lens 218 from all angles when approaching or interacting with the ticket reader system 106. Lens 218 may incorporate a downwardly projecting sealing ring 219 that is sized to fit snugly against an interior upper wall of the head section 214 for affixation using an adhesive sealant or other affixation means to discourage water penetration into an interior of the head section.

The cap 220 may comprise a generally circular fitting that covers an upper end of the head section 214 and may comprise a slightly domed top surface configured to permit moisture to run off the head section and to reduce build-up of dust. The cap 220 may be removable to permit access to the internal components of head section 214 for maintenance or replacement. In an embodiment, cap 220 is formed of cast urethane or plastics.

FIG. 2B is a front elevation view of the ticket reader of FIG. 2A. FIG. 2C is a side elevation view of the ticket reader of FIG. 2A. FIG. 3A is an enlarged view of a reader head section of the ticket reader of FIG. 2A. Referring first to FIG. 2B, in an embodiment, the mounting table 216 may fit within a recess in the head section 214 that is approximately as wide as the head section 214 and may extend partly into the head section, forming an aperture that includes a translucent illumination surface 217, as best seen in profile in FIG. 2C. In some embodiments, the surface 217 may include a transparent window 302 as seen in FIG. 3A through which a camera or other sensor may receive visible light that is reflected from the ticket 102 based on ambient light or light sources within the head section.

In this arrangement, a portion of mounting table 216 such as lower wall 303 may include a printed, etched or molded target symbol, indicia or region that attracts the user 202 to present the ticket 102 in that area in proximity to the sensors, readers or cameras that are contained within the head section 214. In an embodiment, the target symbol is aligned over the location of an antenna of an RFID reader module in the head section 214. In an embodiment, the target may be indicated using a satin finish whereas non-target portions of the surface 217 or table 216 may be prepared using a high-gloss finish so that the target is contrasting and easily seen in a variety of lighting conditions. Further, the sensors, readers or cameras are sheltered from weather conditions and also rest above a cavity that may achieve a partial state of shade to facilitate, for example, the use of laser-based barcode scanners or other devices that rely upon detection of reflected light as a basis for reading the coding element 104.

In an embodiment, as seen in FIG. 2C and FIG. 3A, the head section 214 is mounted adjacent to a second recess 240 in a rear portion of an upper end of the skirt 212. In an embodiment, the second recess 240 is approximately as wide as the skirt 212 but is relatively short in height, yet still provides sufficient space to receive a gloved hand or a tool for removing the head section 214 from the housing. In this arrangement, the second recess 240 is configured to provide a gripping area with which the head section 214 may be grasped and urged upward to remove the head section from the skirt 212 for purposes of maintenance or storage. In one embodiment, the second recess 240 is approximately 110 mm wide and 48 mm tall.

FIG. 2D is an exploded perspective view of the ticket reader of FIG. 2A. In an embodiment, base post 210 comprises a generally circular base element 252 and an elongated cylindrical post element 250 having a lower end 250A that is affixed perpendicularly to the base element. In an embodiment, the base post 210 may be formed of sheet and tubular metal parts; for example, lower end 250A of post element 250 may be welded to the base element 252. The base element 252 may comprise a plurality of pins, or holes to receive fasteners, or other means for affixing the base element to a mounting service such as a floor or hardscape. In an embodiment, base post 210 may comprise a 40" tall, 2½" diameter crowd control stanchion, such as those available from QueueMaster, with any retractable belt system removed or omitted.

In an embodiment, an upper end 250B of post element 250 may be received in an opening in a lower end 212A of the skirt 212, which fits substantially entirely over the base post 210 and is affixed on the base post. Head section 214 may be affixed to the upper end 250B of the base post 210 adjacent to an upper end 212B of the skirt 212 using fasteners, an annular bold, or a snug friction fit, as further described herein for FIG. 3B. In an embodiment, skirt 212 is optional and may be omitted.

3. Example Electronic Structure and Function

FIG. 3B is a section view of the reader head section of FIG. 3A taken along line 3-3 of FIG. 2B and illustrating certain internal elements. In an embodiment, as seen in FIG. 3B, post element 250 extends upwardly into a lower portion of head section 214 through a generally circular recess in a lower wall 215 of the head section and may be affixed in that position by a fixation element 310. In various embodiments, fixation element 310 may comprise a twist-lock fitting configured to engage complementary slots in an upper portion of post element 250, a nut, a friction fitting, or other means for snugly attaching the head section 214 to the post element 250 and on the skirt 212. For example, fixation element 310 may be configured to twist-lock into one or more corresponding holes or slots in the base post 210 that are otherwise normally used for installation of a retractable belt assembly on the base post.

An upper end of skirt 212 may serve as an affixation surface for lens 218 which extends circumferentially around a perimeter of the upper end of the housing. In an embodiment, a circuit board 360 carries active electronic elements as further described for FIG. 4 and is attached to mounting table 216. These elements may include an antenna 362 that is coupled to a wireless network interface on circuit board 360 for the purpose of communicating ticket data and validation data wirelessly between the ticket reading system 106 and an external computer that performs ticket validation functions.

In an embodiment, head section 214 further comprises a smart camera 320 affixed to mounting table 216 at an acute angle with respect to a vertical plane, and generally in alignment with transparent window 302, and having an approximate field of view 322. Head section 214 may further comprise a battery 330 that is configured to provide power to the circuit board 360, smart camera 320 and other elements within head section 214 over a relatively long time period associated with ingress to a venue, such as several hours. Battery 330 as shown in FIG. 2D is representative in form and other embodiments may use larger or smaller batteries or battery packs.

For purposes of illustrating a clear example, the drawing figures show an embodiment in which a single smart camera 320 is provided. However, in other embodiments a second camera may be provided to increase the accuracy of reading operations; such an embodiment may also use a second processor in the circuit arrangement shown in FIG. 4 to increase processing power, an additional battery, and other elements.

In an embodiment, head section 214 further comprises a loudspeaker 350 that is positioned within the head section and attached to surface 217 of the mounting table 216, which may comprise a plurality of holes or a recess in the translucent illumination surface 217 to permit audible sound waves to pass through the surface for hearing by the user 202. For example, in one embodiment a vertical rear wall 319 (FIG. 3A) of the mounting table comprises a horizontal or linear row of holes through which sound waves may pass; alternatively a circular array of holes or other arrangements may be used.

In an embodiment, head section 214 further comprises a radio-frequency identification (RFID) detector circuit board 352 that is attached inside a lower, angularly arranged wall 303 of the mounting table 216 and separate from the smart camera 320. For example, wall 303 and the RFID board 352 may be arranged at a downwardly and outwardly sloping angle with respect to a vertical plane in which elongated elements of the ticket reading system 106 are aligned. In this position, the RFID board 352 is likely to be near a position of the ticket 102 when the user 202 brings the ticket into proximity of the ticket reading system 106. In other words, because the mounting table 216 is configured as a natural target that attracts the user 202 to wave or move the ticket toward, the RFID board 352 is likely to be close to the ticket at the time that the user places the ticket near the reading unit. Consequently, the physical arrangement shown in FIG. 3B is expected to result in a high probability of successfully reading a coding element 104 that comprises an RFID tag when the average user 202 attempts a reading operation using average positioning or gestures.

In an embodiment, lower wall 215 also may comprise one or more holes or recesses through which connectors or interface elements coupled to the circuit board 360 may protrude. For example, as further described for FIG. 4, certain external connectors may protrude through lower wall 215 and have wired connections to the circuit board 360. In an embodiment, lower wall 215 otherwise forms a flat planar surface that protects interior components of the head section 214. Indeed, in this arrangement, the head section 214 is self-contained and removable from the skirt 212, so that the head section may be used alternatively as a portable ticket reader in a tabletop environment or handheld arrangement, or as a fixed ticket reader that is mounted to the housing on a fixed pole.

FIG. 4 is a block diagram of digital electronic elements of the ticket reader of FIG. 2A. In an embodiment, ticket reader 106 comprises a circuit board 360 that may be configured as a system carrier board having a microcontroller or CPU 402 coupled to a battery/charging circuit 408, Ethernet interface 412, JTAG header 412, LED driver 416, RS-232 port driver 424, RFID interface 430, audio coder-decoder (codec) 434, SD card slot 440, WiFi module 442, and other elements such as signal conditioning, power regulation, and interface connectors. In one embodiment, the ticket reading system comprises a single carrier board (circuit board 360) that is coupled to a system-on-a-module (SoM) computing device, such as the PhyCore-AM335X SoM module commercially available from PHYTEC Systems of Mainz, Germany and Bainbridge Island, Wash.

In some embodiments, CPU 402 comprises an ARM Cortex A8 application processor, such as the TI Sitara AM335X, configured with 512 MB of DDR2 RAM memory and 512 MB of Flash memory for stored programs and executing a version of the LINUX operating system. The CPU 402 also may comprise power management circuits, Ethernet circuits and USB circuits. For example, two (2) USB ports may be provided with appropriate connectors coupled to the CPU 402 SoM module.

Figure 6A:
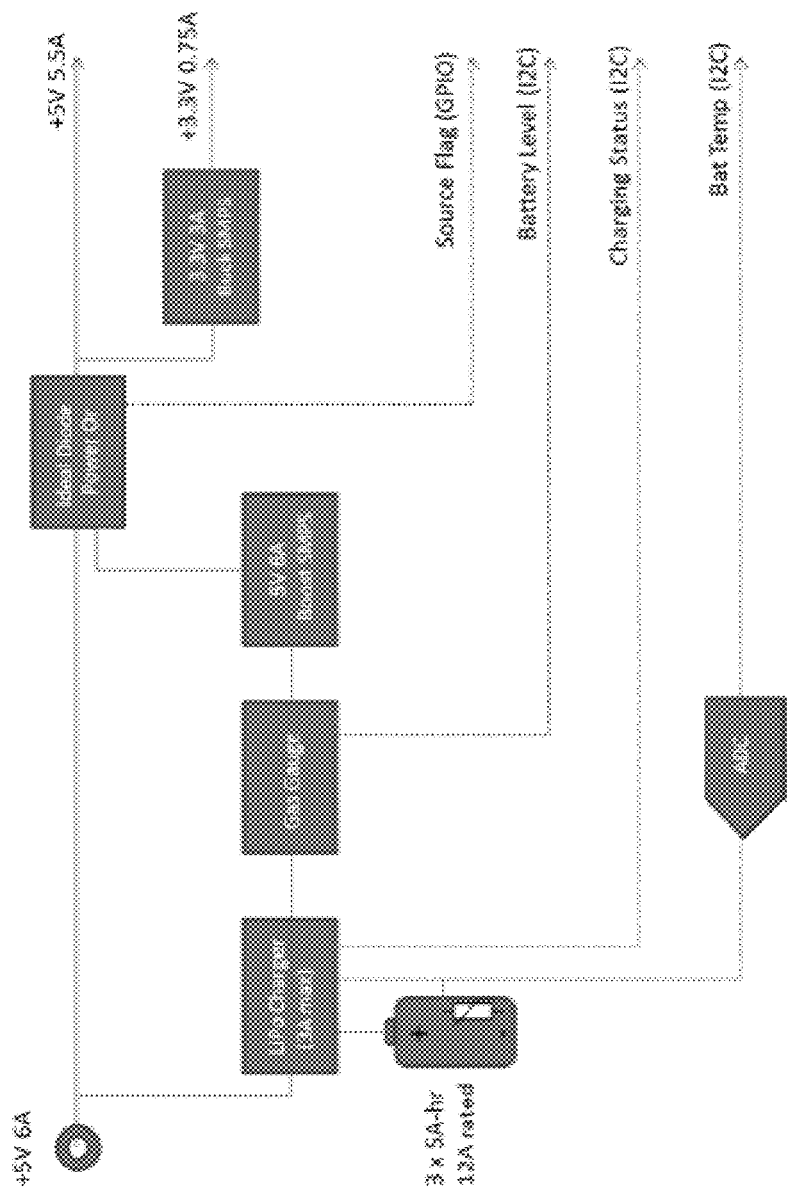
FIG. 6A is a block diagram of a power subsystem that may be used in an embodiment.

In an embodiment, battery/charging circuit 408 comprises the battery 330 seen in FIG. 3B, which may be a lithium polymer (LiPo) battery, and a charging circuit that may be coupled via a power crossover switch to a coaxial power receptacle 406 affixed in the head section 214 and configured to couple to an external AC/DC power source 404. In an embodiment, battery 330 comprises eight (8) size 18650 batteries with integrated charging and discharge limiting in two 4-cell battery holders. FIG. 6A is a block diagram of a power subsystem that may be used in an embodiment. In this example, a lithium ion gas gauge module provides estimates of remaining battery capacity to the SoM via the I$^2$C bus. Battery charging may be performed either with the head section 214 installed on skirt 212 or using a separate charging bay or rack. A load switch may detect when an external power supply is connected and will enable the external supply to bypass the battery and power the circuitry directly, while charging the battery 330 at a reduced rate. The power subsystem may comprise power management circuitry configured to automatically place the circuit board 360 in a low-power state and to signal the load switch to start charging the battery at the full rate. In an embodiment, the power subsystem of FIG. 6A may be configured to provide 5.0VDC for driving the SoM, LED drivers, speaker driver, microphone, smart camera and possibly other components, and a 3.3VDC supply for powering the RS-232 driver, RFID module, and possibly other components.

In various embodiments, an external 5V, 6 A wall-mount charger may be coupled to the head section 214 when installed on skirt 212, or a multi-unit charging rack may be used by detaching head section 214 and placing the head section in the charging rack. FIG. 6B illustrates an example charging rack configuration comprising four (4) charging racks each configured to accept eighteen (18) units of the head section 214 for concurrent charging. In a stadium or arena environment, a plurality of charging bays each comprising a plurality of charging racks as seen in FIG. 6B may be positioned in rooms or other locations that are distributed around the stadium or arena, for example, in multiple separate locations that are near doors, gates, or other ingress positions of the stadium or arena.

In an embodiment, Ethernet interface 412 is coupled to an RJ-45 jack 410 in head section 214 and may be coupled using wired means to an Ethernet network in the position of network 108 (FIG. 1). For example, the SoM may comprise an SMSC LAN8710AI Ethernet PHY IC and an RJ45 connector with integrated magnetics may be used.

In an embodiment, JTAG header 412 is configured to connect to an external debugger for purposes of testing and validating the circuit board 360 and its components.

In an embodiment, RS-232 port driver 424 is coupled to an RJ-11 jack 426 mounted in head section 214 and may be coupled to external computing devices for purposes of debugging, programming or updating. A smart camera 320 may be coupled to the CPU 402 through an appropriate interface, including via the RS-232 port driver 424. In an embodiment, smart camera 320 comprises a Dialogic GFE-4490 smart camera that is configured to automatically decode 1D and 2D barcodes, including QR codes, and transmit decoded data as serial data via the RS-232 interface. In an embodiment, smart camera 320 comprises a laser-based target illuminator that turn on automatically when the camera detects motion within the field of view 322; the target illuminator typically comprises a laser crosshair display that is visible at the target on wall 303.

In an embodiment, the head section 214 also may comprise an ambient light sensor adjacent to the smart camera 320 and configured to detect the illumination of a smartphone display and, in response, to signal the smart camera target illuminator to disable; this approach reduces glare on the screen of a smartphone held by a user when the user is presenting a coded display on the smartphone, such as a QR code, as the user's ticket. Signals from the ambient light sensor also may be processed by appropriate program code to determine a long-term ambient light level, which may be used in response to automatically set the intensity of the field illuminator to provide an idealized contrast-to-power-consumption ratio for given ambient light levels. The ambient light sensor may incorporate an optical color filter that is configured to exclude light from the laser target illuminator of the smart camera 320.

In an embodiment, LED driver 416 and one or more other driver circuits may be coupled to the CPU 402 and to external illumination and sensing elements such as indicator lights 418, a ticket illumination source 420, and a light sensor 422. For example, indicator lights 418 may comprise a 1 W RGB main LED that is mounted adjacent to lens 218 for the purpose of brightly illuminating the lens with different colors of light that correspond to different states of operation of the ticket reading system 106 or different results of attempted operations to validate the ticket 102. Thus, the lens 218 when illuminated provides visual clues to the user from the ticket reading system 106.

In an embodiment, an array of individual LEDs may be used for error indications in addition to a main LED for illuminating the lens 218. The individual LEDs may be selected to have a maximum intensity that is selected to be visible in direct sunlight. In an embodiment, the states of the LEDs such as visible or dark and brightness of the LEDs may be controlled by the SoM via an $I^2C$ command that is sent to the LED driver 416. In an embodiment, when an error occurs, the entire lens 218 appears yellow and specific indicator LEDs in a rear position of the head section 214 show one or more of the following states:

1. Wireless networking connectivity is not connected;
2. Battery is low;
3. General reader malfunction.

In an embodiment, the main LED is gated by a separate watchdog circuit that the SoM periodically polls to ensure that the main LED remains illuminated, thus providing a failsafe mechanism so that if the CPU 402 crashes, the ticket reading system 106 automatically switches to a mode that is easily identified externally as an error mode.

Further, the LED driver 416 may be configured to control field illumination in the field of view 322 (FIG. 3). In an embodiment, ticket illumination source 4320 comprises a field illumination system located in the head section 214 adjacent to smart camera 320 with which a red or green target is projected downward onto wall 303. In an embodiment, an Avago ASMT-MG00 LED with an ASMT-M006 collimating lens projects a concentrated spot of light having a narrow beam width onto the wall 303 of the mounting table 216. In an embodiment, in normal operation the LED projects green light onto the target area and if a ticket has been scanned or read and is invalid, under control of program code, the LED is driven to a red color.

The RFID interface 430 may be coupled to an RFID reader or other Near Field Communications (NFC) reader in head section 214. In an embodiment, the RFID reader is coupled to the SoM via a serial UART port and may comprise an ISO-14443A/B certified RFID module configured to read identifiers from MIFARE-type RFID cards or tags; as an example, the SkyeTek Gemini RFID module may be used.

In some embodiments, an RFID module that supports near-field communications (NFC) in peer-to-peer mode may be used, to enable reading the unique identifier (UID) of a smartphone or other mobile computing device when the smartphone or device is operating in tag emulation mode. In some smartphones and other devices, tag emulation mode allows an NFC-enabled phone to generate signals that are equivalent to those of an RFID tag that has been excited by an external stimulus signal. In some embodiments, the use of NFC peer-to-peer mode enables the software and processes described herein to execute peer-to-peer transactions that allow the reader module to exchange data with the smartphone or other device, providing added layers of security for ticket validation operations or for the purpose of associating a particular scanned ticket with a particular end user device.

The codec 434 may be coupled to a loudspeaker 432 and/or a microphone 432 for purposes of delivering audio output or receiving sound input. For example, in one embodiment, the CPU 402 executes stored programs that provide for issuing audio tones, sounds or other audible feedback to the user 202 when a ticket reading operation is attempted, succeeds and/or fails. In an embodiment, different distinctive sounds, tones, or stored digital audio files may be played or sounded in response to different operations of the ticket reading system; thus different sounds may be used for successful ticket validation and for failed validation.

In an embodiment, codec 434 comprises the Wolfson WM8974 mono audio codec coupled to an $I^2C$ control bus and coupled to a TI LM48511 audio amplifier and delivers up to 5 W to an 8Ω or 4Ω speaker 432, which may have a frequency range of 100 Hz to 10 kHz and rated for 6 W peak power. The SoM may shut down the amplifier when it is not in use, and volume control may be accomplished by adjusting the amplitude of the signal from the codec under program control. In an embodiment, to provide an optimal audio volume to the user, an analog microphone circuit coupled to microphone 432 periodically samples ambient noise at the ticket reading system 106 and uses the resulting sampled signal level under program control using a feedback loop to provide an optimal signal level to the user. Additionally or alternatively, a separate audio control circuit may be implemented on the circuit board 360 that requires less real-time polling by the CPU 402. An analog power detector/integrator may provide an averaged estimate of the noise power as an analog voltage that can be sampled by the processor at a much lower rate than the primary system; the integrator may be reset by the SoM and an analog-digital converter may sample the integrated power and send the value using an $I^2C$ command.

In an embodiment, the SD card slot 440 is configured to couple to an external memory card that may contain stored programs or may be used to download performance data or other data relating to the operation of the ticket reading system 106.

In an embodiment, the WiFi module 442 is coupled to an antenna 444 that may be mounted in head section 214 to enable wireless communication of instructions and data to and from the ticket reading system and other computers. WiFi module 442 may comprise the LS Research TiWi-R2 802.11b/g/n module on circuit board 360 and interfaced via an MMC2 port and a U.FL receptacle coupled to an external antenna 444, which may be a low-profile 5.0 GHz antenna. In an embodiment, antenna 444 is mounted on circuit board 360 to provide maximum signal strength based upon the position of the circuit board at the top of the head section 214. In some embodiments, enhanced wireless communications capability may be achieved by coupling the WiFi module 442 to accessory modules, such as the LS Research TiWi-BLE module or TiWi-5 module to provide Bluetooth communications and/or 5.0 GHz 802.11/a/b/n/g capability.

Embodiments may implement safety elements such as transient voltage suppressor circuits to protect against electro-static discharge damage, and one or more digital temperature sensors coupled to the SoM for polling, under control of appropriate program code, to determine whether the SoM or other elements of circuit board 360 or head section 214 are within specified temperature ranges. For example, sensors on the battery 330 may determine whether the battery is operating at an acceptable temperature. An autonomous fan controller circuit may be coupled to a DC fan to cool the interior of the head section 214 by sensing a temperature of the interior and turning the fan on when the temperature exceeds a specified threshold. In some embodiments, an alternate control path may enable the SoM to turn on the fan under control of appropriate program code.

Figure 5A:
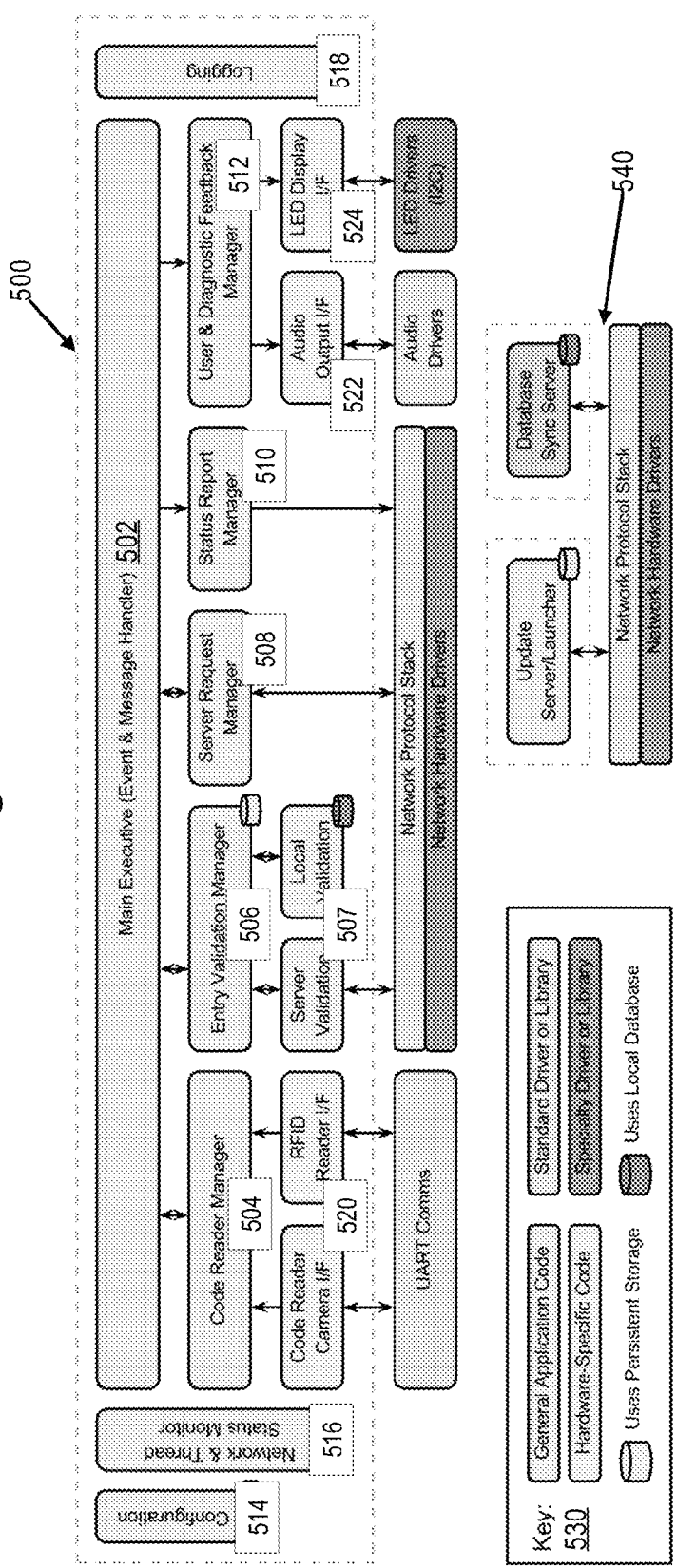
FIG. 5A is a block diagram of a software architecture that may be used with the ticket reader of FIG. 2A, FIG. 4.

FIG. 5A is a block diagram of a software architecture that may be used with the ticket reader of FIG. 2A, FIG. 4. In an embodiment, one or more computer programs, other software elements, or other logic may be configured as shown in FIG. 5A and loaded into the memory of CPU 402 for execution to control and operate the ticket reading system 106. In one embodiment, elements of FIG. 5A may be implemented in the PYTHON language using pseudo-threads, or C or C++, and elements within the broken box can be implemented as a unitary application 500 whereas elements outside the broken box are implemented at the hardware layer. In FIG. 5A, a key 530 indicates types of code, drivers or libraries that may be used in an embodiment and whether elements use persistent storage or a local database. For purposes of illustrating a clear example, FIG. 5A illustrates selected functional elements and a complete working embodiment may include other elements such as an operating system. For example, the LINUX operating system or a variant may be used.

In an embodiment, the architecture of FIG. 5A is modular, using class hierarchies to encapsulate functions and to abstract higher-level functions from lower-layer hardware implementations and interfaces. Multi-threading may be used to support modularity with asynchronous event handling; threads may communicate using message queues or using shared data.

In an embodiment, a main executive 502 implements event handling and message queue management and message handling functions to coordinate operation of functional elements at other logical layers that are shown in FIG. 5. A configuration unit 514 may be configured to receive system configuration instructions, to parse and interpret the instructions, and to change configuration variables of other elements to implement particular specified operations or functions. A status monitor 516 may be configured to monitor network status and the execution of different threads that are active on CPU 402. For example, the architecture of FIG. 5A may be implemented using multi-threaded execution on CPU 402 and the status monitor 516 may function to identify blocked threads or to coordinate suspension and reactivation of threads.

A code reader manager 504 may be configured to receive data from the smart camera, RFID reader, or other code readers, and to form messages or events that reflect codes that have been read and provide the messages or events to other elements via executive 502. For example, code reader manager 504 may be coupled to a code reader camera interface and/or RFID reader interface 520, which in turn are coupled to one or more UART devices that handle hardware-level communications with the camera and/or reader.

An entry validation manager 506 may be configured to perform entry validation functions such as determining whether a particular ticket 102, as represented by an identifier encoded using code element 104, is a valid ticket for a particular date, time, venue, and event. Entry validation manager 506 may be coupled to one or more of a server validation unit and local validation unit 507 that are configured to use a network protocol stack and network hardware drivers to perform network communications with an external server computer or local database to obtain validation results.

A server request manager 508 and status report manager 510 also may be coupled to the network protocol stack for the purpose of communicating requests to an external server computer and for forming periodic status reports that contain status data relating to performance of the ticket reading system 106.

A user/diagnostic feedback manager 512 may be coupled to an audio output interface 522 and to audio drivers that are coupled to a loudspeaker, and to an LED display interface 524 that is coupled to LED drivers. These systems may be configured to provide audio and visual feedback to users and to provide diagnostic output indicating successful operation and/or errors during validation or other operations. For example, in one embodiment the LED display interface 524 drives a plurality of LEDs that implement a beacon light having a plurality of colors, animations and other states that are visible through lens 218.

A logging unit 518 may be configured to generate log entries as operations are performed by the executive 502 and the other functional elements of FIG. 5A. Log entries may indicate, for example, user actions, validation actions, validation responses or results, errors, and other operations. Log entries may support auditing operations and debugging by indicating which tickets were scanned or read, the results of validation actions, errors or failures to validate, or other values.

In an embodiment, an update server/launcher and a database sync server may be coupled via the network protocol stack to external persistent storage and to a local database, as indicated at block 540.

Figure 5B:
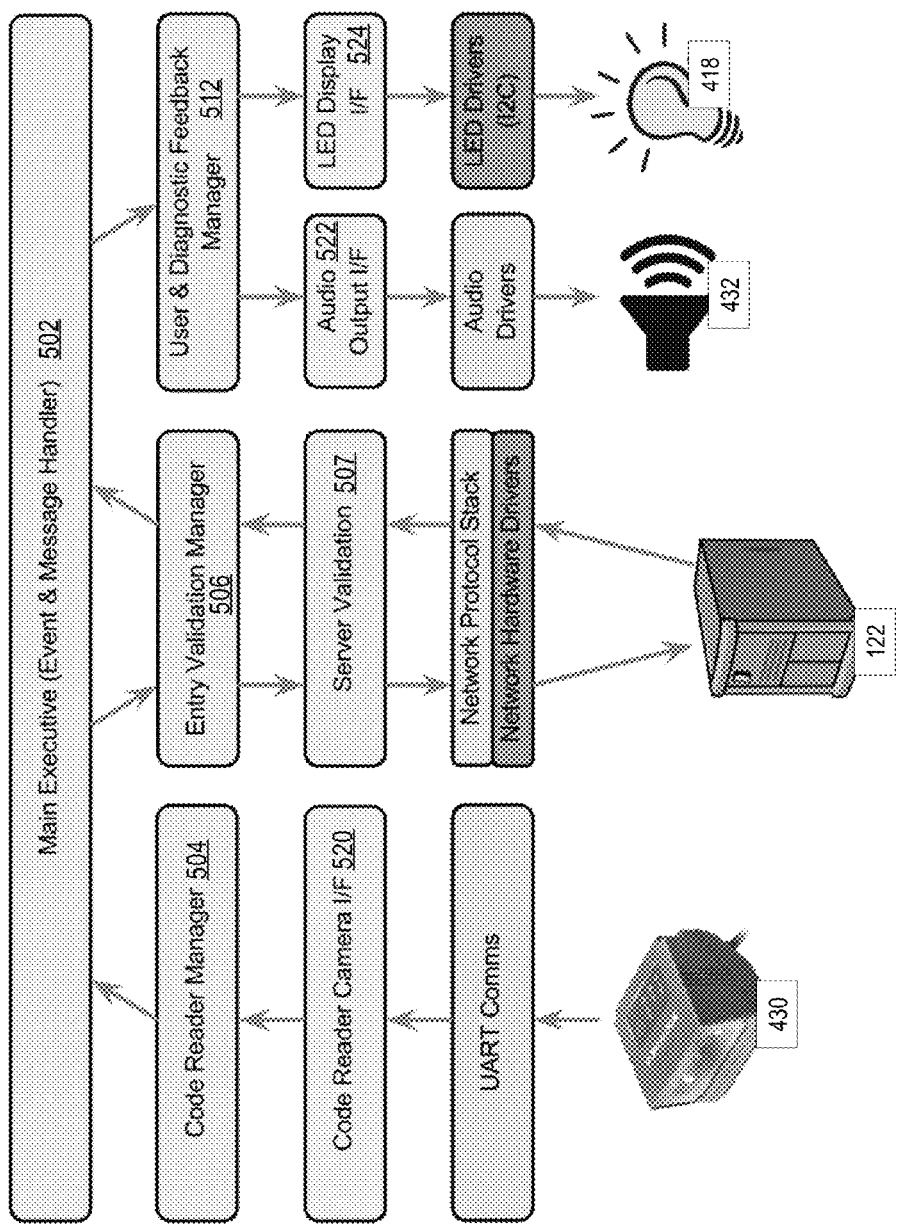
FIG. 5B is a block diagram illustrating example data flow paths among elements of the software architecture of FIG. 5A.

FIG. 5B is a block diagram illustrating example data flow paths among elements of the software architecture of FIG. 5A during an example ticket reading operation.

As an example, assume that a ticket 102 is presented at a ticket reading system 106 and a unique identifier value, such as a ticket number, encoded in the code element 104 of the ticket is detected using the smart camera 430. The smart camera 430 asserts a signal at the hardware level that provides data to UART communications circuits, which signal the code reader camera interface 520. The code reader manager 504 then receives a message or frame from the camera interface 520 that contains data that the smart camera 430 read, and notifies executive 502.

In response, the executive 502 forms an event or message and calls entry validation manager 506. The entry validation manager 506 calls server validation unit 507, which issues a message or packet via the network protocol stack and network hardware drivers to cross the network (e.g., network 108 of FIG. 1) to reach the user profile server computer 124 or ticketing server computer 122. One or more of these server computers perform a ticket validation operation and determine a ticket validation result. In response, the server computer sends a network message across network 108 to ticket reading system 106, where the message proceeds up the network protocol stack to server validation unit 507. The server validation unit 507 interprets the message and forms a response for entry validation manager 506 indicating either validation or failure. Entry validation manager provides a validation event to executive 502.

In response, executive 502 publishes the validation event to user/diagnostic feedback manager 512. Recognizing a validation event, the manager 512 instructs the audio output interface 522 to play a sound indicating validation via audio drivers to loudspeaker 432. Concurrently the manager 512 instructs the LED display interface 524 to drive the LED drivers to cause LED lamps 418 to illuminate using a particular color. As a result, the user 202 sees and hears validation signals indicating whether the ticket was positively validated or determined to be invalid.

Embodiments of the ticket reader system 106 as described herein support a plurality of different operational modes. In an embodiment, light emitted through the lens 218 may have multiple different colors based upon operations, states, or validation status during use of the ticket reader system 106. In an embodiment, light emitted through the lens may use various animation effects to indicate different states or results of ticket validation. For example, in one embodiment, stored programs implemented as shown in FIG. 5A, FIG. 5B support the following process.

Initially, the ticket reader system 106 is in a standby mode and the beacon light visible through lens 218 may be white in color to alert a user that the ticket reader system is available for use. In some embodiments, the white light may flash or use various animation techniques to attract users to an available ticket reader system 106. At this point, a user 202 such as a fan, patron or other customer of a facility using the ticket reader system 106 approaches the system and places a ticket 102 near the mounting table 216. One of the cameras, readers or other sensors in the ticket reader system 106 scans, reads or otherwise detects a unique identifying code in the code element 104 of the ticket 102. The process described above for FIG. 5B is performed to validate the identifying code of the ticket. When validation is successful, under program control the CPU 402 signals the LED drivers to drive the beacon light to a green color to signal a successful scan. If validation fails, then the CPU 402 may signal the LED drivers to drive the beacon light to a yellow or red color to indicate failure. The beacon light then may be driven to a white color to signal the user to attempt another scan. Alternatively, the yellow or red color may change to a flashing or animated state to alert staff of the venue that an invalid ticket was attempted and intervention or review may be needed.

In an embodiment, the beacon light may be driven to a yellow or orange color in response to the CPU 402 detecting an error or failure in the ticket reader system 106, to signal staff of the venue that the unit is inoperative or needs investigation. In an embodiment, after displaying an all-yellow or all-orange state to indicate an error, one or more individual LEDs behind lens 218 are illuminated to indicate particular errors. In an embodiment, the beacon light may comprise an array of LEDs arranged in spaced-apart positions around a perimeter of the lens 218, and the cap 220 may be marked with identifiers of particular LEDs in the array. For example, each LED in a set of three or four of the LEDs may be configured to be illuminated to indicate different types of errors or problems with the ticket reader system 106 so that staff of the venue may rapidly determine the type or nature of an error by observing which individual LED is illuminated and which identifier marking on the cap 220 corresponds to that individual LED. In the preceding paragraph, the term LED is used broadly to refer to any kind of solid-state or incandescent illuminating element including lamps, LCD elements, and other displays. For example, in some embodiments an alphanumeric display, LCD display, e-ink or other bistable display, may be used in place of LEDs.

TABLE 1, TABLE 2, TABLE 3, TABLE 4, TABLE 5, TABLE 6 set forth below provide further description of the structure and function of example software elements of FIG. 5A, FIG. 5B.

TABLE 1

OVERVIEW OF MAIN EXECUTIVE
The Main Executive is the primary controller and event manager for the device application.

| | |
|---|---|
| Description | Provides initialization and event-based sequencing of the application - communicates with the software subsystems under its control |
| Instantiation | Created by main( ) |
| Initialization | Creates a private incoming message queue |
| | Clips the logfile, if needed |
| | Sets its operating mode to UNKNOWN |
| | Reads local configuration data and instantiates the other components, namely: |
| |     User and Diagnostic Feedback Manager |
| |     Code Reader Manager |
| |     Server Info Manager |
| |     Status Report Manger |
| |     Entry Validation Manager |
| | Monitors the startup of each subsystem and repeatedly calls the User and Diagnostic Feedback Manager to provide visual and audible feedback about the startup state |
| | Sets its operating mode to FAILURE if unrecoverable errors occurred during startup and/or self-tests |
| | Verifies network connectivity of various subsystems |
| | Sets its operating mode to ACTIVE_ONLINE or ACTIVE_OFFLINE (or FAILURE, depending on configuration) depending on whether server connections were available |
| | Requests supported software version information from the server (via the Server Info Manager) and sets its operating mode to FAILURE if the reader device and server software versions are incompatible |
| | Request various information from Server Info Manager |
| | Starts its event loop in its own thread |
| Operating Mode | Event loop in the context of the main thread, waits on message queue - times out every second to check for timer-based (periodic) tasks |

TABLE 1-continued

OVERVIEW OF MAIN EXECUTIVE
The Main Executive is the primary controller and event manager for the device application.

| | |
|---|---|
| Operation | Blocks waiting for incoming messages |
| | Interrupts message queue blocking (using a timeout) to check if time-based tasks need to be triggered |
| | Receives ticket codes from Code Reader Manager: |
| |     Passes ticket code to Entry Validation Manager |
| |     Requests User and Diagnostic Feedback Manager to indicate that ticket was read and awaiting validation, and/or to interrupt feedback already in progress |
| | Receives entry validation results from Entry Validation Manager requests User and Diagnostic Feedback Manager to provide feedback (good, bad, or error) |
| | Requests User and Diagnostic Feedback Manager to provide "ready" feedback when able to scan tickets and no other feedback is in progress |
| | Handles special QR control codes configures other device software subsystems (and OS functions, e.g. network configuration) accordingly |
| | Periodically instructs the Server Info Manager to request the desired operating mode (INACTIVE, ACTIVE-ONLINE, etc.) and current event ID/date (if any) from the server - the period is configurable (initial testing will use a ten seconds) |
| | Periodically instructs the Status Report Manager to send a status report to the server - the period is configurable (initial testing will use a five seconds) |
| | Monitors for failures |
| Public Methods | Called by Code Reader Manager: |
| |     ProcessTicketCode (type, value) |
| | Called by Entry Validation Manager: |
| |     ProcessValidationResult (entryResultRecord) |
| | Called by Server Info Manager: |
| |     ProcessServerInfo(entryResultRecord) |
| Callbacks | None |

TABLE 2

CODE READER SUBSYSTEM

2.1 - CODE READER MANAGER

| | |
|---|---|
| Description | Provides a high-level interface between Main Executive and the lower-level Code Reader Camera I/F and RFID Reader I/F components. |
| Instantiation | Created by Main Executive as a singleton instance |
| Initialization | Creates a private incoming message queue |
| | Determines the code reader camera type(s) using a connected hardware identification library and instantiates one hardware-specific Code Reader Camera I/F component per camera |
| | Determines the RFID reader type(s) using a connected hardware identification library and instantiates one hardware-specific RFID Reader Camera I/F component per RFID reader |
| | Starts its event loop in its own thread |
| Operating Mode | Event loop in its own thread, waits on message queue |
| Operation | Blocks waiting for incoming messages |
| | Dispatches configuration and control commands from Main Executive to Code Reader Camera I/F and RFID Reader I/F |
| | Receives scanned ticket codes from Code Reader Camera I/F and RFID Reader I/F |
| | Filters tickets codes for invalid types and formats (for those not filtered elsewhere) |
| | Filters multiple same ticket codes received within a short (configurable) period of time (debouncing) |
| | Filters multiple scans of the same ticket code seen within a short (configurable) period of time (debouncing) |
| | Arbitrates between nearly simultaneous multiple code results (e.g. mobile RFID and QR) |
| | Passes ticket codes to the Main Executive |
| Public Methods | Called by Main Executive: |
| |     EnableCodeScanning(T/F) |
| |     UpdateCodeTypesAndFormats( ) |
| | Called by Code Reader Camera I/F or RFID Reader I/F: |
| |     ProcessTicketCode(type, value) |
| Callbacks | Callback to Main Executive: |
| |     ProcessTicketCode (type, value) |

TABLE 2-continued

CODE READER SUBSYSTEM

2.2 - CODE READER CAMERA INTERFACE

| | |
|---|---|
| Description | Presents a high-level interface to Code Reader Manager and a harware-specific low-level interface to the code reader camera(s) - described for the case of the selcted Datalogic GFE-4490 camera |
| Instantiation | Created by Code Reader Manager, one per attached camera(only one expected for now) |
| Initialization | Creates a private incoming message queue<br>Establishes RS-232 serial communication with camera at 115200 bps - will use the Python "pySerial" library module<br>Verifies that the camera is the expected Datalogic GFE-4490<br>Resets the Camera's default configuration and fully configures the camera for the ticket reading application, including enabling event-specific code types and formats<br>Starts its event loop in its own thread |
| Operating Mode | Event loop in its own thread, waits for incoming serial data, serial read times out every second to check incoming message queue for commands |
| Operation | Blocks waiting for incoming serial data from camera<br>Reads decoded ticket codes from the serial port<br>Filters tickets codes for invalid types and formats<br>Returns ticket codes to Code Reader Manager<br>Periodically interrupts serial port blocking read to check for and process any waiting incoming command messages from Code Reader Manager |
| Public Methods | Called by Code Reader Manager:<br>ResetCamera( )<br>EnableCodeScanning(T/F)<br>UpdateCodeTypesAndFormats( ) |
| Callbacks | Callback to Code Reader Manager:<br>ProcessTicketCode (type, value) |
| Notes | Public methods are derived from a "generic" base class<br>Datalogic GFE-4490 camera is an OEM variant of the camera successfully used for the PoC devices (manual is here) |

2.3 - RFID READER INTERFACE

| | |
|---|---|
| Description | Presents a high-level interface to Code Reader Manager and a hardware-specific low-level interface to the RFID reader - described for the case of the selected SkyeTek Gemini |
| Instantiation | Created by Code Reader Manager, one per attached RFID reader (only one expected for now) |
| Initialization | Creates a private incoming message queue<br>Establishes TTL-level UART serial communication with RFID reader at 115200 bps - will use the Python "pySerial" library module<br>Verifies that the RFID reader is the expected SkyeTek Gemini<br>Resets the RFID reader's default configuration<br>Starts its polling loop in its own thread |
| Operating Mode | Event loop in its own thread, polls RFID reader every 200 milliseconds (command and reply), periodically checks incoming message queue for commands |
| Operation | Polls the reader for card/tag presence (every 200 milliseconds), queries the UID when a card/tag is present<br>Filters UIDs codes for invalid types and formats<br>Returns ticket codes (UIDs) to Code Reader Manager<br>Between successive polls of the reader, checks for and processes any waiting incoming command messages from Code Reader Manager |
| Public Methods | Called by Code Reader Manager:<br>ResetReader( )<br>EnableCodeScanning(T/F)<br>UpdateCodeTypesAndFormats( ) |
| Callbacks | Callback to Code Reader Manager:<br>ProcessTicketCode (type, value) |
| Notes | Public methods are derived from a "generic" base class<br>SkyeTek Gemini OEM reader supports a wide variety of RFID tags, NFC tags, and mobile devices in card emulation and peer-to-peer vmodes (manual is here)<br>Initially, the application will read UIDs from MIFARE-type cards/tags and mobile devices in card emutation mode - further NFC capabilities (such as mobile device peer-to-peer) can be implemented in future phases<br>After testing, it may be necessary to adjust some parameters of the RFID reader to optimize reading performance<br>The RFID reader that was used for the PoC devices is the Identive Multi-ISO Serial OEM RFID reader (AMIM2US00) - this reader has some disadvantages relative to the SkyeTek unit (larger footprint, no external antenna support, no peer-to-peer NFC support, higher cost) but could be used as an alternative part. |

Table 3

Entry Validation Subsystem

In an embodiment, an entry validation subsystem is used to check whether a given decoded ticket identifier is valid for entry to the current event. If the ticket reading system 106 is in data communication with server computer 122, 124, then entry validations are performed by checking with the server. If a connection cannot be established to the server, then entry validations may be performed locally, using a cached list of valid entry identifiers.

TABLE 3

| ENTRY VALIDATION SUBSYSTEM | |
|---|---|
| 3.1 - ENTRY VALIDATION MANAGER | |
| Description | Provides a high-level interface between Main Executive and Server/Local Validation components |
| Instantiation | Created by Main Executive as a singleton instance |
| Initialization | Creates a private incoming message queue<br>Instantiates the Server Validation and Local Validation components<br>Starts its event loop in its own thread |
| Operating Mode | Event loop in its own thread, waits on message queue |
| Operation | Blocks waiting for incoming messages<br>Receives ticket codes from Main Executive<br>Determines whether server or local validation should take place and passes ticket code to the appropriate component<br>Receives validation results from Server Validation and Local Validation components<br>Filters multiple validation results received for the same ticket code within a short (configurable) period of time (debouncing)<br>Records the results of all validations in an audit log<br>Returns entry validation results to Main Executive |
| Puplic Methods | Called by Main Executive:<br>ProcessTicketCode (type, value)<br>Called by Server Validation or Local Validation components:<br>ProcessValidationResult(entryResultRecord) |
| Callbacks | Callback to Main Executive:<br>ProcessValidationResult (entryResultRecord) |
| 3.2 - SERVER VALIDATION COMPONENT | |
| Description | Presents a high-level interface to Entry Validation Manager and the low-level network communications to the Usher server |
| Instantiation | Created by Entry Validation Manager as a singleton instance |
| Initialization | Creates a private incoming message queue<br>Tests the connection to the Usher server<br>Starts its event loop in its own thread |
| Operating Mode | Event loop in its own thread, waits on message queue - also writes to and reads from server - all blocking calls have configurable timeouts |
| Operation | Blocks waiting for incoming messages<br>Receives tickets codes for validation from Entry Validation Manager<br>Sends requests for entry validation to Usher server<br>Receives entry validation replies from Usher server<br>Matches validation requests with replies from the server<br>Sends validation results to the Entry Validation Manager<br>Sends acknowledgements of successful validation results to Usher server<br>Periodically pings Usher server to verify network connectivity<br>Handles communication errors (timeouts) and retries |
| Public Methods | Called by Entry Validation Manager:<br>RequestValidation(entryRequestRecord) |
| Callbacks | Callback to Entry Validation Manager:<br>ProcessValidationResult (entryRequestRecord) |
| Notes | Server Validation sequence is request to server, reply from server, acknowledge to server (if reply indicated successful entry)<br>Server Validation component assigns a local unique identifier (reset at device startup) to each validation request sent to the server - the identifier is passed back in the entry validation reply<br>RequestValidation ( ) method monitors incoming message queue to see if requests are backing up<br>A separate class implements the message and protocol details of the http entry validation communications to/from the Usher server - uses the Python "requests" and "json" library modules |
| 3.3 - LOCAL VALIDATION COMPONENT | |
| Description | Presents a high-level interface to Entry Validation Manager and interacts with the local ticket code database (cached records of ticket codes that are valid for a given event/date) |
| Instantiation | Created by Entry Validation Manager as a singleton instance |
| Initialization | Creates a private incoming message queue<br>Tests the connection to the database<br>Starts its event loop in its own thread |

TABLE 3-continued

ENTRY VALIDATION SUBSYSTEM

| | |
|---|---|
| Operating Mode | Event loop in its own thread, waits on message queue |
| Operation | Blocks waiting for incoming messages |
| | Receives tickets codes for validation from Entry Validation Manager |
| | Checks if a ticket identifier is in database and hasn't already been validated (used) |
| | After validating a ticket identifier, marks its record in the database as validated (used) and records a validation time and kiosk ID |
| | Sends validation results to the Entry Validation Manager |
| Public Methods | Called by Entry Validation Manager: |
| | RequestValidation (entryRequestRecord) |
| Callbacks | Callback to Entry Validation Manager: |
| | ProcessValidationResult (entryResultRecord) |
| Notes | A background service on the device will synchronize the local database (probably SQLite 3) for a given event/date with the same-event/date database records on Usher server when network connectivity is available |
| | RequestValidation ( ) method monitors incoming message queue to see if requests are backing up |

TABLE 4

SERVER INFO MANAGER

| | |
|---|---|
| Description | Presents a high-level interface to Main Executive to request information from the Topdog server |
| Instantiation | Created by to Main Executive as a singleton instance |
| Initialization | Creates a private incoming message queue |
| | Tests the connection to the Topdog server |
| | Starts its event loop in its own thread |
| Operating Mode | Event loop in its own thread, waits on message queue - also writes to and reads from server - all blocking calls have configurable timeouts |
| Operation | Blocks waiting for incoming messages |
| | Receives server information request from the Main Executive |
| | Sends a message to the Topdog server requesting a given type of information |
| | Waits for a reply from the server and returns the reply information to Main Executive |
| | Handles communication errors (timeouts) and retries |
| | Periodically pings Topdog server to verify network connectivity |
| Public Methods | Called by Main Executive: |
| | RequestServerInfo(entryRequestRecord) |
| Callbacks | Callback to Main Executive: |
| | ProcessServerInfo(entryResultRecord) |
| Notes | Request types are: |
| |     local time (for synchronization) |
| |     supported software version IDs |
| |     operating mode |
| |     current event ID/date |
| |     event-specific media and parameters (audio, light animation sequences, ticket code types/formats) |
| | RequestServerInfo( ) method monitors message queue to see if requests are backing up |
| | A separate class implements the message and protocol details of the http server information communications to/from the Topdog server - uses the Python "requests" and "json" library modules |

TABLE 5

STATUS REPORT MANAGER

| | |
|---|---|
| Description | Presents a high-level interface to Main Executive to send device status reports to the Topdog server |
| Instantiation | Created by to Main Executive as a singleton instance |
| Initialization | Creates a private incoming message queue |
| | Tests the connection to the Topdog server |
| | Starts its event loop in its own thread |
| Operating Mode | Event loop in its own thread, waits on message queue - also writes to and reads from server - all blocking calls have configurable timeouts |

TABLE 5-continued

| | STATUS REPORT MANAGER |
|---|---|
| Operation | Blocks waiting for incoming messages<br>Receives status report request from the Main Executive<br>Sends device status to the Topdog server - no reply is expected<br>Waits for a reply from the server and returns the reply information to Main Executive<br>Handles communication errors (timeouts) and retries<br>Periodically pings Topdog server to verify network connectivity |
| Public Methods | Called by Main Executive:<br>ReportStatus( ) |
| Callbacks | None |
| Notes | Individual software component report their status to a central status (thread-safe) object - Status Report Manager reports using the current status data in this object<br>The status information that is transmitted is defined in the Foreman Architecture document, and includes:<br>    operating mode<br>    component health<br>    battery level<br>    numbers of communication errors<br>    numbers of incomplete or failed reads<br>    average/min/max latencies of ticket validation service<br>    Wi-Fi signal strength<br>    current software version<br>Periodic status reports act as a heartbeat to inform the Topdog server that the ticket reader device is "alive"<br>ReportStatus( ) method monitors message queue to see if requests are backing up<br>A separate class implements the message and protocol details of the RabbitMQ status reports to the Topdog server - uses the Python "py-amqplib" library module |

TABLE 6

| | USER & DIAGNOSTIC FEEDBACK SUBSYSTEM |
|---|---|
| | 6.1 - USER & DIAGNOSTIC FEEDBACK MANAGER |
| Description | Provides a high-level interface between Main Executive and the Audio Output and LED Display interfaces |
| Instantiation | Created by Main Executive as a singleton instance |
| Initialization | Creates a private incoming message queue<br>Instantiates hardware-specific Audio Output I/F and LED Display I/F components based on a connected hardware identification library<br>Starts its event loop in its own thread |
| Operating Mode | Event loop in its own thread, waits on message queue |
| Operation | Blocks waiting for incoming messages<br>Receives feedback action requests from Main Executive<br>Based on the requested action, calls the Audio Output I/F to play a specific sound file<br>Based on the requested action, calls LED Display I/F to perform a specific LED display action |
| Public Methods | Called by Main Executive:<br>DoEntryFeedback(action)<br>DoDiagnosticFeedback(type)<br>SetVolumePerc(0..100) |
| Callbacks | None |
| Notes | Entry feedback actions include:<br>    good ticket read<br>    bad ticket read<br>    rescan ticket read<br>    abort feedback<br>Diagnostic feedback is visual and indicates startup state and error conditions - describe elsewhere is this document<br>A central configuration object includes default and per-event/date media information (per-action sounds and LED animations) |
| | 6.2 - AUDIO OUTPUT INTERFACE |
| Description | Presents a high-level interface to User & Diagnostic Feedback Manager and a low-level interface to the underlying audio hardware and its drivers |
| Instantiation | Created by User & Diagnostic Feedback Manager as a singleton instance |
| Initialization | Creates a private incoming message queue<br>Initializes the audio device<br>Starts its polling loop in its own thread |

TABLE 6-continued

USER & DIAGNOSTIC FEEDBACK SUBSYSTEM

| | |
|---|---|
| Operating Mode Operation | Event loop in its own thread, waits on message queue<br>   Blocks waiting for incoming messages<br>   Receives and processes requests to change volume level<br>   Receives and processes requests to play an mp3 or wav sound file<br>     from memory or local persistent storage<br>   Receives and processes requests to stop playing an-progress sound |
| Public Methods | Called by User & Diagnostic Feedback Manager:<br>   SetVolumePerc(0 . . . 100)<br>   PlaySound(soundFileID)<br>   StopSound( ) |
| Callbacks | None |
| Notes | Public methods are derived from a "generic" base class<br>Will use the Python "pygame.mix" library module |

6.3 - LED DISPLAY INTERFACE

| | |
|---|---|
| Description | Presents a high-level interface to User & Diagnostic Feedback Manager and a low-level interface to the underlying LED driver hardware |
| Instantiation | Created by User & Diagnostic Feedback Manager as a singleton instance |
| Initialization | Creates a private incoming message queue<br>Initializes the LED driver hardware<br>Starts its polling loop in its own thread |
| Operating Mode Operation | Event loop in its won thread, waits on message queue<br>   Blocks waiting for incoming messages<br>   Receives and processes requests to perform an LED display action<br>     An action may be single or an animation sequence<br>     Central configuration object includes mapping from actions to<br>     desired intensity, color, and duration of the LED display<br>     (which can be specified for each LED individually or for<br>     groups of LEDs)<br>   Receives and processes requests to abort an in-progress LED display action |
| Public Methods | Called by User & Diagnostic Feedback Manager:<br>   DoLedAction(action)<br>   StopLedAction( ) |
| Callbacks | None |
| Notes | Public methods are derived from a "generic" base class<br>Uses an internal thread, queue, and timers to generate and execute the timing sequence of LED settings for a given LED display action<br>LED driver communications, currently PC, will use the Python "smbus" library module |

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

The computer system shown in FIG. 4 includes a main memory, such as a random access memory (RAM) or other dynamic storage device, coupled to a bus for storing information and instructions to be executed by the CPU 402. Main memory also may be used for storing temporary variables or other intermediate information during execution of instructions to be executed by CPU 402. Such instructions, when stored in non-transitory storage media accessible to CPU 402, render the computer system into a special-purpose machine that is customized to perform the operations specified in the instructions.

The computer system of FIG. 4 may implement the processes described herein using customized hard-wired logic, one or more ASICs or FPGAs, firmware and/or program logic which in combination with the computer system causes or programs the computer system to be a special-purpose machine. According to one embodiment, the techniques herein are performed by the computer system in response to CPU 402 executing one or more sequences of one or more instructions contained in main memory. Such instructions may be read into main memory from another storage medium, such as an SD card or networked data storage devices. Execution of the sequences of instructions contained in main memory causes CPU 402 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise a bus in circuit board 360. Transmission media can also take the form of acoustic or light waves, such as those generated during radio-wave and infra-red data communications.

Various forms of media may be involved in carrying one or more sequences of one or more instructions to CPU 402 for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on the bus. The bus carries the data to main memory, from which CPU 402 retrieves and executes the instructions. The instructions received by main memory may optionally be stored on a storage device either before or after execution by CPU 402.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A ticket reading system comprising:
a portable head section comprising an aperture and means for removably affixing the head section to a stationary fixture;
in the portable head section, a camera mounted with a field of view over the aperture and configured to read visible code elements of a ticket; a radio-frequency identification (RFID) antenna and RFID module adjacent to the aperture and configured to read RFID or NFC code elements from a mobile computing device or RFID tag; a computer comprising at least a processor coupled to a non-transitory computer-readable storage device; a wireless network communication module configured to communicate data packets among the processor and a wireless network access point; means for providing ticket validation feedback;
wherein the storage device comprises one or more sequences of instructions which, when executed by the processor, cause the processor to perform: receiving a ticket identifier value from one of the camera or the RFID module; forming and sending a request via the wireless network communication module for a server computer to validate the ticket identifier value; receiving a ticket validation response from the server computer via the wireless network communication module; based upon the ticket validation response, driving the means for providing ticket validation feedback to generate either valid response feedback or invalid response feedback.

2. The ticket reading system of claim 1, wherein the camera is mounted above and downwardly facing a target region of the aperture, and wherein the RFID antenna is mounted under and adjacent to the target region.

3. The ticket reading system of claim 1, wherein the means for providing ticket validation feedback comprises a plurality of light-emitting diodes (LEDs) and an LED driver circuit, wherein the storage device comprises sequences of instructions which when executed cause driving the LEDs to one or more different display states based upon the ticket validation response.

4. The ticket reading system of claim 3, wherein the means for providing ticket validation feedback further comprises a loudspeaker and a codec, wherein the storage device comprises sequences of instructions which when executed cause driving the codec to generate one or more different audible sounds based upon the ticket validation response.

5. The ticket reading system of claim 1, wherein the portable head section comprises a mounting table in the head section and defining the aperture; an annular light ring affixed to a top end of the head section; a circuit board carrying the computer and affixed on the mounting table adjacent to the light ring.

6. The ticket reading system of claim 5, wherein the portable head section comprises an antenna coupled to the wireless network communication module and affixed on the circuit board.

7. The ticket reading system of claim 1, wherein the portable head section comprises a field illumination system and a target illumination system affixed in an upper portion of the portable head section and directed downward toward a target region of the aperture.

8. The ticket reading system of claim 1, wherein the portable head section is generally cylindrical, wherein the stationary fixture comprises a crowd control stanchion and an elongated cylindrical skirt over the stanchion, wherein the portable head section is removably affixed to the stanchion, and wherein the skirt comprises a generally rectangular aperture at a top end of the skirt and adjacent to the head section when the head section is affixed to the fixture.

9. The ticket reading system of claim 8 wherein the portable head section and the elongated cylindrical skirt have a same outside diameter.

10. The ticket reading system of claim 8 wherein the portable head section comprises a twist lock element that is configured to lock onto a top end of the stanchion.

11. The ticket reading system of claim 1, wherein the means for providing ticket validation feedback comprises a plurality of light-emitting diodes (LEDs) and an LED driver circuit, wherein the storage device comprises sequences of instructions which when executed cause driving the LEDs to one or more different display states based upon the ticket validation response, and further comprising a plurality of status indicators that are separately drivable to indicate operational states of the ticket reading system.

12. The ticket reading system of claim 1, wherein the storage device comprises a local validation component comprising one or more sequences of instructions which, when executed by the processor, cause the processor to perform: determining that the wireless network communication module is not associated with the wireless network access point; querying a local ticket code database to validate the ticket identifier value; receiving a local ticket validation response from the local ticket code database; in response to the local ticket validation response, driving the means for providing ticket validation feedback to generate either valid response feedback or invalid response feedback.

13. The ticket reading system of claim 1 wherein the ticket comprises a graphical display on the mobile computing device.

14. A ticket reading system comprising:
a portable head section comprising an aperture and a charging connector that is configured for removably affixing the head section to a charging station;
in the portable head section, a camera mounted with a field of view over the aperture and configured to read visible code elements of a ticket; an RFID antenna and RFID module adjacent to the aperture and configured to read RFID or NFC code elements from a mobile computing device or RFID tag; a computer comprising at least a processor coupled to a non-transitory computer-readable storage device; a wireless network communication module configured to communicate data packets between the processor and a wireless network access point; a plurality of light-emitting diodes, a loudspeaker and a sound driver circuit that are configured to provide ticket validation feedback;
wherein the storage device comprises one or more sequences of instructions which, when executed by the processor, cause the processor to perform: receiving a ticket identifier value from one of the camera or the RFID module; forming and sending a request via the wireless network communication module for a server computer to validate the ticket identifier value; receiving a ticket validation response from the server computer via the wireless network communication module; based upon the ticket validation response, driving the means for providing ticket validation feedback to generate either valid response feedback or invalid response feedback.

15. The ticket reading system of claim 14, wherein the storage device comprises a local validation component comprising one or more sequences of instructions which, when executed by the processor, cause the processor to perform: determining that the wireless network communication module is not associated with the wireless network access point; querying a local ticket code database to validate the ticket identifier value; receiving a local ticket validation response from the local ticket code database; in response to the local ticket validation response, driving the means for providing ticket validation feedback to generate either valid response feedback or invalid response feedback.

16. The ticket reading system of claim 14 wherein the ticket comprises a graphical display on the mobile computing device.

* * * * *